United States Patent

[11] 3,625,973

[72] Inventor Marc Julia
       Paris, France
[21] Appl. No. 749,295
[22] Filed Aug. 1, 1968
[45] Patented Dec. 7, 1971
[73] Assignee Institut Pasteur
[32] Priority Aug. 17, 1967
[33] France
[31] 118053

[54] PREPARATION OF OXYGEN CONTAINING INDOLE DERIVATIVES
9 Claims, No Drawings

[52] U.S. Cl. .................................................. 260/326.16,
                                                                260/999
[51] Int. Cl. ..................................................... C07d 27/56

[50] Field of Search ................................................ 260/326.16

[56] References Cited
OTHER REFERENCES
Hauptmann et al. Chem. Abs. vol. 65: 5432 (1966)

*Primary Examiner*—Nicholas S. Rizzo
*Assistant Examiner*—Joseph A. Narcavage
*Attorney*—McGlew and Toren ABSTRACT: Method of preparing indole derivatives bearing an oxygen containing group the oxygen of which is linked with one of the carbon atoms in positions 4 and 7, which comprises cyclizing in acid medium a 4-(2'-pyrrolyl)-butyric acid or its direct derivative having optionally substitutions in its aliphatic chain or/and in its pyrrolic nucleus.

PREPARATION OF OXYGEN CONTAINING INDOLE DERIVATIVES

This invention relates to a new process for the preparation of indole derivatives bearing an oxygen containing substituent in four position; it is primarily an object of the invention to provide tetrahydro-4-indolone, 4-hydroxy- indole and 4-alkoxy-indoles, which can be besides include other substitutions.

These compounds are highly attractive as intermediate products in the preparation of various substances exerting a strong action on the central nervous system, such as, for instance, the psilocybine or 4,7-indolo-quinones usable as antibiotics.

The usual known processes for preparing indole derivatives, as presented here, include the use of 2-nitro-6-alkoxy-toluene or 1,3-cyclohexane-dione, as respectively described in "Helvetica Chemica Acta" 1955, Vol. 38, P. 1452 and "Berichte" 1958, Vol. 91, P. 1344. However, these rather laborious methods, are not quite satisfactory and are difficulty applicable for obtaining the tetrahydro-4-indolones and 4-hydroxy-indole nonsubstituted in the two and three positions.

The present invention allows one to easily obtain the wished substances, with satisfactory yields from a quite available starting material.

The new process consists in cyclising the 4-(2'2 -pyrrolyl)-butyric acid or one of its derivatives.

The principal step of the process can be illustrated by the reaction:

(1)
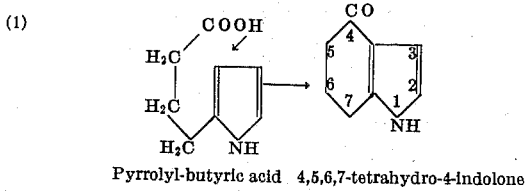

Pyrrolyl-butyric acid    4,5,6,7-tetrahydro-4-indolone

In a second step of the new process, the reaction path to go from the indolone to the hydroxy-indole, is the following dehydrogenation:

(2)
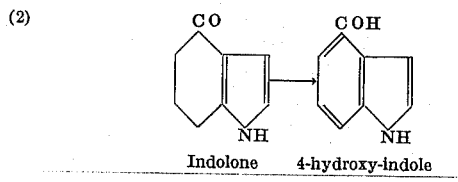

Indolone    4-hydroxy-indole

When obtaining an alkoxy-indole is required, the process includes a third step in which an alkaline derivative of the hdyroxy-indole is prepared an reacted with an halide of that radical, such as alkyl, aryl or other, which is wished to substitute for the hydrogen of the OH group. The cyclization in accordance with the invention may be applied to 4-(2'-pyrrolyl)-butyric acid itself, to its alkoxy-carbonic anhydride, to its nitrile, or corresponding compounds, one of several carbon atoms of butyric chain of which bear substitutions; in this latter case, corresponding substituted hydroxy-indoles or indolones are obtained. Thus, the invention allows one to synthesize not only tetrahydro- 4-indolones, 4-hydroxy or 4-alkoxy-indole, but also homologs of these compounds; substitutions can also be present in the pyrrole cycle, if, when preparing the pyrrolyl-butyric acid, a substituted pyrrole is used. Particularly, the cyclization according to the invention can provide compounds bearing, on one or several of their carbon atoms, such radicals as methyl, ethyl, propyl, isopropyl, butyl, isobutyl, tertbutyl, and so on.

The process of the invention is achieved by an acidic treatment of pyrrolyl-butyric acid or of one of its derivatives. The acidic cyclizing agent can be for instance phosphoric acid or an acidic halide of a metal, especially the stannic and zinc chlorides.

A particularly useful method consists in cyclizing the combined ethoxy-carbonic anhydride of pyrrolyl-butyric acid by the action of $SnCl_4$, or better again with $ZnCl_2$.

The cyclization is preferably carried on in the cold, specially at room temperature.

The starting material of the new process, i.e., the pyrrolyl-butyric acid or its derivatives, can be obtained, with good yields, by known processes, and therefore it is not useful to give here details about. It will not only be remembered that Grignard's reaction permits of obtaining from pyrrole and 4-chloro-butyronitrile, the 4-(2'-pyrrolyl-butylronitrile (J. Org. Chem. 1965, 30, 344), which can be subjected to the cyclisation in accordance with the invention, though giving 4-indolone with yields which are not as good as when the corresponding acid is used. As for the 4-(2'-pyrrolyl)-butyric acid, it can be prepared by the known method of VILSMEIER and HACK, with a yield over 70 percent, by condensing beta-methoxy-carbonyl-N-dimethyl propionamide with pyrrole with the help of phosphorus oxychloride; such a condensation gives the 4-(2'-pyrrolyl)-ceto-4-methyl propionate, by reducing with hydrazine hydrate, in the presence of potassium hydroxide which saponifies the ester group, there is obtained the 4-(2'-pyrrolyl)-butyric acid potassium salt, free from 3-isomer.

The invention is illustrated by the following nonlimitative examples.

EXAMPLE 1

Preparation of 4,5,6,7,-tetrahydro-4(or 7)-indolone.

26.5 g. (0.173 mole) of 4-(2'-pyrrolyl)-butyric acid, melting at 55° C., prepared from the corresponding nitrile, are dissolved in 100 ml. of the methylene chloride. Twenty-four ml. of triethylamine and then, little by little 16.7 ml. of ethyl chloroformate are added to the solution cooled down to −10° C. After 30 minutes of resting in the cold, the precipitate which has formed is separated off by filtration.

The solution is poured into a flask fitted with an efficient agitator; 200 ml. of methylene chloride are then added. The whole is set under nitrogen atmosphere and 40 ml. of anhydrous tin tetrachloride dissolved in 200 ml. of methylene chloride are introduced little by little.

The reaction medium is stirred for 3 h. in the cold. After stirring 1 liter of chloroform and an amount of 6N ammonia sufficient to make the medium basic are added.

The tin hydroxide which has precipitated is separated off by filtration and washed with chloroform. The aqueous phase is submitted to extraction by chloroform, after which the organic phases are gathered, dried off and evaporated.

The 18.4 g. of raw product obtained are submitted to separation in a chromatographic column filled with 200 g. of silica, and 200 g. of celite, the eluent used being chloroform.

The two tetrahydroindolone crystallized isomers are thus separated, quantities and properties of which are set forth below.

| 4,5,6,7-TETRAHYDRO-7-INDOLONE: | | | |
|---|---|---|---|
| 3.4 g. Melting point 95° C. | | | |
| Analysis: Calculated | C 71.09 | H 6.71 | N 10.36 |
| Found | 71.20 | 6.47 | 10.13 |
| Infrared spectrum: | 3,185 | 3,086 | 2,941 |
| | 2,841 | 1,615 | 1,400 |
| | 1,040 | 770 | |
| Ultraviolet spectrum: | λ max. = 286 m. | log ε=4.244 | |
| 4,5,6,7-TETRAHYDRO-4-INDOLONE: | | | |
| 3.8 g. Melting point 187°C. (1 | | 88°-189° according to literature | |
| Boiling 160°-180° C. under 0.02 mm. Hg | | | |
| Infrared spectrum: | 3,260 | 2,930 | 2,860 |
| | 1,640 etc. | | |
| Ultraviolet spectrum: | λ max. = 243 m. | log ε=3.956 | |
| | 275 | | 3.886 |

EXAMPLE 2

Preparation of 4,5,6,7-tetrahydro-4-indolone.

The operation in the same as in example 1, but 41.6 g. (0.272 mole) of 4-(2'-pyrrolyl)-butyric acid, prepared from 4-(2'-pyrrolyl)-ceto-methylbutyrate by the known above mentioned method, are used. Since this acid includes substantially no isomer leading to 7-indolone, the preparation exclusively gives the 4,5,6,7-tetrahydro-4-indolone with a yield of 28 percent with respect to the acid used.

The melting temperature found was 187° C., as in the above example.

EXAMPLE 3

Preparation of 4,5,6,7-tetrahydro-4-indolone.

24 g. (0.156 mole) of the same pyrrolyl butyric acid as in example 2, are dissolved in 400 ml. of 1,2-dichloro-ethane and the solution is cooled to −5° C.

15.8 g. of triethylamine (0.157 mole) and 17 g. of ethyl chloroformate (0.157 mole) are added.

After 1 h. standing in the cold, the precipitate which has occurred is separated off by filtration and then washed with 100 ml. of dichloro-1-2-ethane. 0.5 l. of methylene chloride and 135 g. of anhydrous $ZnCl_2$ (0.336 mole) freshly melted, are added.

The reaction medium is allowed to stand in the cold for 2 h., after which it is hydrolysed by the addition of 500 ml. of 2N hydrochloric acid. The aqueous phase is decanted off and washed thrice with chloroform; then the organic phase is dried on sodium sulfate.

After the evaporation of solvent, chromatography is carried out on 150 g. of silica and 150 g. of celite, with chloroform as eluent.

11.6 g. of tetrahydro-4-indolone, melting at 187° C., is thus obtained with a yield of 55 percent relative to the starting acid.

EXAMPLE 4

Preparation of 4-hydroxy-indole.

Fourteen g. (0.104 mole) of 4,5,6,7 tetrahydro-4-indolone are introduced, with charcoal containing 5 g. (10 percent of palladium, into 500 ml. of paracymene; the mixture is heated under reflux in nitrogen atmosphere for 40 h.

After cooling, the catalyst is filtered off and rinsed out with methanol. Then the methanol is cold evaporated off, after which chromatography takes place on 80 g. of silica and 80 g. of celite, the eluent being benzene. The weight of crystals produced is 7.9 g., what means a yield of 55 percent reckoned on the indolone used.

The 4-hydroxy-indole obtained melts at 97° C. after recrystallisation in petroleum ether against 97–99° according to literature. Its boiling temperature is 100° C. under 0.01 mm. Hg.

EXAMPLE 5

Preparation of 7-hydroxy-indole.

The operations are as in example 4, but one starts from 4.5 g. of 4,5,6,7-tetrahydro-7-indolone. The white crystals obtained weigh 2.3 g., meaning a yield of 50 percent. The melting of the product occurs at 99° C.

EXAMPLE 6

Preparation of 4-ethoxy-indole.

6.65 g. of 4-hydroxy-indole (0.05 mole) are introduced into 100 ml. of hexamethyl-phosphotriamide. One g. (0.042 mole) of sodium hydride and 6.8 g. (0.062 mole) of ethyl iodide are added.

The mixture is heated under nitrogen to 70° C. for 12 h. After cooling, it is introduced into water and acidified with HCl.

The method is ether extracted; after washing with water, the ethereal phase is sodium sulfate dried and evaporated.

The chromatography of the raw product thus obtained, on a 30 g. of silica and 15 g. of celite mixture, with benzene as eluent, yields:

4.32 g. of 4-ethoxy-indole, melting at 71° C., identified by determining the melting point of its mixture with a sample of authentic 4-ethoxy-indole, as well as by IR and UV spectra; and 2.78 g. of 4-hydroxy-indole, melting at 97° C.

Thus, the ethoxy-indole has been obtained with a transformation rate of 52 percent.

Though examples 4 and 5 show, the dehydrogenation of indolone and the reduction of ketone by heating in a solvent, in the presence of a palladiumized catalyst, this very advantageous process is not only one which can be utilized in the scope of the invention. Indeed, every known method may be used, in one or several steps, to pass from the tetrahydro-indolone to the hydroxy-indole, without deviating from the spirit of the present invention.

I claim:

1. Method of preparing 4,5,6,7-tetrahydro-indolones, which consists in cyclizing a compound selected from the group consisting of 4-(2'-pyrrolyl) butyric acid; 4-(3'-pyrrolyl) butyric acid; 4-(2'-pyrrolyl) butyric nitrile; 4-(3'-pyrrolyl) butyric nitrile; the ethoxy-carbonic anhydride of 4-(2'-pyrrolyl) butyric acid; the ethoxycarbonic anhydride of 4-(3'-pyrrolyl) butyric acid; and derivatives thereof wherein an alkyl group having one to about four carbon atoms is present on the pyrrolyl nucleus, in a solvent, by adding thereto an acidic material selected from the group consisting of phosphoric acid, tin tetrachloride, and zinc chloride, stirring the mixture obtained until tetrahydro-indolone is formed, and then extracting the indolone from the reaction mixture.

2. Method of preparing 4,5,6,7-tetrahydro-4indolone which consists in cyclizing 4-(2'-pyrrolyl)butyric acid dissolved in an inert solvent by adding to its solution an acidic material selected from the group consisting of phosphoric acid, tin tetrachloride and zinc chloride, keeping the solution in contact with said acidic material until indolone is formed, separating the acidic material, and extracting the indolone from the reaction medium.

3. Method of preparing 4,5,6,7-tetrahydro-7 indolone which consists in cyclizing 4-(3'-pyrrolyl) butyric acid dissolved in an inert solvent by adding to its solution an acidic material selected from the group consisting of phosphoric acid, tin tetrachloride and zinc chloride, keeping the solution in contact with said acidic material until indolone is formed, separating the acidic material, and extracting the indolone from the reaction medium.

4. Method according to claim 2, wherein said 4-(2'-pyrrolyl) butyric acid is first combined with triethylamine.

5. Method according to claim 3, wherein said 4-(3'-pyrrolyl) butyric acid is first combined with triethyl-amine.

6. Method according to claim 4, wherein said solvent is selected from the group consisting of methylene chloride, dichloro-1,2-ethane and chloroform.

7. Method according to claim 5, wherein said solvent is selected from the group consisting of methylene chloride, dichloro-1,2-ethane and chloroform.

8. Method according to claim 6, wherein the indolone is extracted from its solution by liquid phase chromatography.

9. Method according to claim 7, wherein the indolone is extracted from its solution by liquid phase chromatography.

* * * * *